United States Patent
Jang et al.

(10) Patent No.: US 7,935,448 B2
(45) Date of Patent: May 3, 2011

(54) METHOD AND APPARATUS FOR CONTROLLING OPERATION OF DIRECT METHANOL FUEL CELL SYSTEM

(75) Inventors: Won Hyouk Jang, Seoul (KR); Jung Kurn Park, Seoul (KR); Myeong Ju Ha, Seoul (KR); Hyun Kim, Seoul (KR); Jin Hong An, Seoul (KR)

(73) Assignee: Samsung SDI Co., Ltd. (KR)

( * ) Notice: Subject to any disclaimer, the term of this patent is extended or adjusted under 35 U.S.C. 154(b) by 1027 days.

(21) Appl. No.: 11/746,817

(22) Filed: May 10, 2007

(65) Prior Publication Data

US 2007/0264544 A1    Nov. 15, 2007

(30) Foreign Application Priority Data

May 11, 2006 (KR) ........................ 10-2006-0042322
Nov. 30, 2006 (KR) ........................ 10-2006-0120141

(51) Int. Cl.
*H01M 8/04* (2006.01)
(52) U.S. Cl. ......... 429/431; 429/432; 429/442; 429/447
(58) Field of Classification Search .................. None
See application file for complete search history.

(56) References Cited

U.S. PATENT DOCUMENTS

2003/0157385 A1    8/2003  Beckmann et al.

FOREIGN PATENT DOCUMENTS

| EP | 1 280 218 A1 | 1/2003 |
|----|----|----|
| EP | 1 321 995 A2 | 6/2003 |
| JP | 2006-252954 | 9/2006 |
| JP | 2006-286321 | 10/2006 |
| JP | 2006-318715 | 11/2006 |
| KR | 2005-46785 | 5/2005 |
| KR | 2007-39359 | 4/2007 |
| WO | WO 02/49125 A2 | 6/2002 |

OTHER PUBLICATIONS

Search Report issued in European Patent Application No. 07107877.8 on Aug. 31, 2007.

*Primary Examiner* — Jonathan Crepeau
(74) *Attorney, Agent, or Firm* — Knobbe Martens Olson & Bear LLP

(57) ABSTRACT

A method and an apparatus for controlling the operation of a fuel cell system. The method can include, actively controlling the fuel cell system without a fuel concentration sensor by: measuring an output voltage, an output current, and a temperature of a fuel cell stack; obtaining a first fuel feeding amount corresponding to the measured output values; comparing a reference temperature corresponding to the measured output values with the measured temperature; and obtaining a second fuel feeding amount by compensating the first fuel feeding amount with a value corresponding to difference between the reference temperature and the measured temperature.

11 Claims, 5 Drawing Sheets

METHOD AND APPARATUS FOR CONTROLLING OPERATION OF DIRECT METHANOL FUEL CELL SYSTEM

CROSS-REFERENCE TO RELATED APPLICATIONS

This application claims the benefit of Korean Application No. 2006-120141, filed Nov. 30, 2006, in the Korean Intellectual Property Office and Korean Application No. 2006-42322, filed May 11, 2006, in the Korean Intellectual Property Office, the disclosures of which are both incorporated herein by reference.

BACKGROUND OF THE INVENTION

1. Field of the Invention

Aspects of the present invention relate to a fuel cell, and a method and an apparatus for controlling operation of a fuel cell system.

2. Description of the Related Art

A fuel cell is a low pollution, high efficiency power generating system, that can directly transform chemical energy from a fuel into electric energy. In particular, fuel cells can use alternative energy sources, such as, natural gas, methanol, and the like instead of petroleum, to generate electricity. Fuel cells have, therefore, attracted attention as next generation energy sources. A fuel cell can be classified as a phosphoric acid fuel cell (PAFC), a molten carbon fuel cell (MCFC), a solid oxide fuel cell (SOFC), a polymer electrolyte membrane fuel cell (PEMFC), an alkaline fuel cell (AFC), and the like, according to the type of electrolyte the fuel cell includes. All of these fuel cells operate on basically the same principle, but use different fuels, and have different operating temperatures, catalysts, electrolytes, and so on.

In a direct methanol fuel cell (DMFC), a polymer membrane, capable of conducting a hydrogen ion, is used as an electrolyte, and a methanol fuel is directly supplied to an anode. The DMFC does not need a fuel reformer and operates at a temperature of less than 100° C., making the DMFC particularly suitable for use in a portable or small fuel cell structure.

Generally, the output of a DMFC varies according to its system characteristics, such as, the temperature of a stack, the amount and the concentration of a supplied fuel, etc. Specifically, the concentration of the fuel is a system variable closely related to a voltage-current curve of the fuel cell. In other words, a DMFC has an optimum fuel concentration for producing a maximum efficiency. Accordingly, for a conventional DMFC to achieve a stable operation and a high efficiency, a concentration sensor is used to set an optimum fuel concentration, and the DMFC system is controlled to operate at the optimum fuel concentration. However, most concentration sensors exhibit a decreased sensitivity over time when measuring a fuel concentration. Therefore, the reliability of concentration sensors is reduced over time, and thus, it is difficult to achieve stable and continuous operations in conventional DMFC systems.

To solve the foregoing problems, there has been proposed a method of controlling operation of the fuel cell without using a concentration sensor. For example, Korean Patent First Publication No. 2004-93421, Nov. 5, 2004, Sony Co. Ltd., entitled "FUEL CELL AND METHOD OF OPERATING THE SAME," discloses a method of measuring the power density of an upper power generating unit placed in an upper fuel stream and the power density of a lower power generating unit placed in a lower fuel stream; and adjusting the fuel concentration when the voltage of the upper power generating unit differs from that of the lower power generating unit, so that a concentration sensor is not needed.

However, the foregoing related art teaches a fuel cell stack that requires two power generating units, at the upper and lower fuel streams, making the fuel cell stack more difficult to manufacture, as compared with a conventional fuel cell stack requiring a single power generating unit. Further, the foregoing related art cannot be applied to a fuel cell stack having a single power generating unit.

SUMMARY OF THE INVENTION

Accordingly, aspects of the present invention provide a control method for a fuel cell system, which can be easily applied to an existing direct methanol fuel cell system, without employing a concentration sensor.

It is an aspect of the present invention to provide a method and an apparatus that use a correlation function between the variance of a system state, except a fuel concentration, and the supplied amount of fuel, to control a fuel cell system in real-time, at an optimum state. The method can include dynamically controlling the amount of fuel supplied, over large output variations.

Another aspect of the present invention is to provide a direct methanol fuel cell system that uses the control method.

According to an aspect of the present invention, provided is a control method for a fuel cell system, comprising: measuring an output voltage, an output current, and a temperature of a fuel cell stack; obtaining a first fuel feeding amount corresponding to the measured output values, by referring to a reference fuel feeding amount related to the output values of the fuel cell stack; comparing a reference temperature corresponding to the measured output values, with the measured temperature; and obtaining a second fuel feeding amount, by compensating the first fuel feeding amount with a value corresponding to a difference between the reference temperature and the measured temperature.

According to an aspect of the invention, the method further comprises: comparing the second fuel feeding amount and a current fuel feeding amount supplied to the fuel cell stack; and adjusting the current fuel feeding amount using the second fuel feeding amount.

According to an aspect of the invention, the adjusting of the current fuel feeding amount to the second fuel feeding amount comprises adding fuel to a fuel mixture supplied to the fuel cell stack, to adjust the concentration of the mixed fuel.

According to an aspect of the invention, the fuel cell system comprises a fuel container to store a hydrogen containing fuel, such as a hydrocarbon containing fuel, and a recycler to receive unreacted water and fuel from the fuel cell stack and a hydrogen containing fuel from the fuel container. The recycler can mix the unreacted fuel, the water, and the hydrogen containing fuel to produce a mixed fuel. The adding of the fuel comprises supplying the hydrogen containing fuel from the fuel container to the recycler.

According to an aspect of the invention, the substituting of the current fuel feeding amount, by the second fuel feeding amount, comprises adding fluid to the mixed fuel supplied to the fuel cell stack, to decrease the fuel concentration of the mixed fuel to a desired concentration. The fuel cell system comprises a water tank to store water, and the fluid comprises water stored in the water tank. The fuel cell system comprises a recycler to store unreacted fuel and water from the fuel cell stack, and a heat exchanger, coupled to a conduit connecting the fuel cell stack and the recycler, to regulate the amount of water. The addition of the fluid, to decrease the concentration of the current fuel, comprises increasing the amount of water, supplied from the fuel cell stack to the recycler through the connecting pipe, by a predetermined amount.

According to an aspect of the invention, the fuel cell system comprises: a fuel container to store a hydrogen containing fuel; a recycler to receive and mix a liquid, for example water, unreacted fuel from the fuel cell stack, and the hydrogen containing fuel from the fuel container; a heat exchanger, coupled to a conduit, between the fuel cell stack and the recycler, to regulate the amount of water; and a level sensor to sense the level of the fuel stored in the recycler. The present teachings include a method comprising: sensing the level of the fuel stored in the recycler; increasing the amount of the hydrogen containing fuel supplied from the fuel container to the recycler, so that the sensed fuel level becomes higher than the reference fuel level; and increasing the amount of water introduced from the fuel cell stack into the recycler, if the sensed fuel level is lower than a reference fuel level.

The present teachings encompass an apparatus to control the operation of a fuel cell system. The fuel cell system can comprise a fuel cell stack, that comprises an anode electrode, and a cathode electrode, and an electrolyte membrane disposed therebetween. The apparatus comprises: a memory to store information about a reference fuel feeding amount and a reference temperature for output values of the fuel cell stack; and a processor coupled to a sensor to sense a current fuel feeding amount, of the fuel cell stack, a current output voltage, a current output current, and a current temperature of the fuel cell stack. The processor can perform serial operations on the basis of the information sensed by the sensor and the information stored in the memory. The processor can obtain a first fuel feeding amount, corresponding to the current output values, and calculate second fuel feeding amount. The second fuel feeding amount can be calculated by applying a compensation value to the first fuel feeding amount, with the compensation value corresponding to a difference between a reference temperature and the current temperature.

Aspects of the present invention teach a fuel cell system comprising: a fuel cell stack, comprising anode and cathode electrodes, and an electrolyte membrane disposed therebetween, to generate electric energy using electrochemical reactions between a fuel supplied to the anode electrode and an oxidant supplied to the cathode electrode; a sensor to sense the amount of fuel currently supplied to the fuel cell stack, a current output voltage, a current output current, and a current temperature, of the fuel cell stack; a fuel container to store a fuel; a recycler to receive the fuel, unreacted fuel discharged from the fuel cell stack, and water, to produce a mixed fuel, and to supply the mixed fuel to the fuel cell stack; a memory to store information about a reference fuel feeding amount and a reference temperature corresponding to the output values of the fuel cell stack; a controller to obtain a first fuel feeding amount, corresponding to the current output values of the fuel cell stack, and a second fuel feeding amount, by adjusting the first fuel feeding amount by a value corresponding to a difference between the reference temperature and the current temperature.

According to an aspect of the invention, the first fuel feeding amount is calculated using an output current of the fuel cell stack, or an output power, defined by an output voltage and an output current, of the fuel cell stack.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
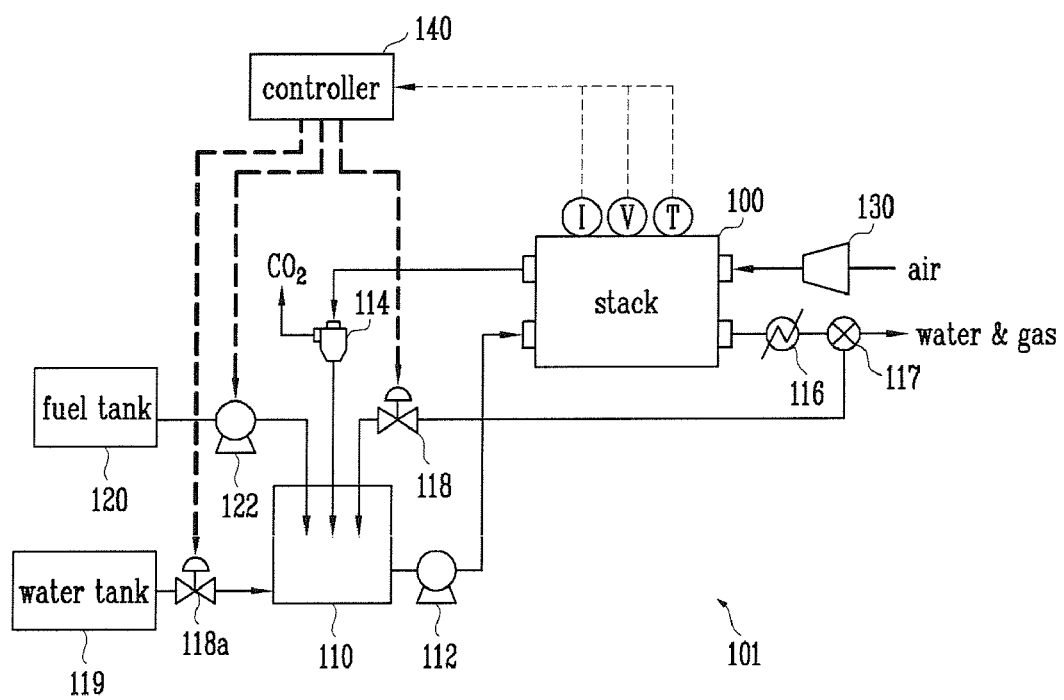
FIG. 1 is a view illustrating a direct methanol fuel cell system using a fuel cell system operation control method, according to an exemplary embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a view illustrating a direct methanol fuel cell system 101 for a fuel cell system operation control method, according to an exemplary embodiment of the present invention. The direct methanol fuel cell system 101 (DMFC system 101) comprises a fuel cell stack 100, a recycler 110, a water tank 119, a fuel tank 120 to store a fuel, and a controller 140. Also, the DMFC system 101 comprises an oxidant feeder 130 to supply an oxidant, such as, air, oxygen, etc., to a cathode of the stack 100.

The stack 100 employs a polymer membrane as an electrolyte and generates electric energy using an electrochemical reaction between a fuel and an oxidant supplied to an anode and a cathode, respectively. The polymer membrane is placed between the anode and the cathode and is capable of exchanging ions.

The recycler 110 stores unreacted fuel and water, discharged from the stack 100 and recycles the stored fuel by returning it to the stack 100 to be reacted. A fuel pump 122 moves the fuel from the fuel tank 120 to the recycler 110. The unreacted fuel and water discharged from the stack 100 and the fuel supplied from the fuel tank 120, are mixed in the recycler 110 to form a mixed fuel. In some embodiments the recycler 110 can function as mixer to mix a fuel and a liquid to produce a mixed fuel without receiving any unreacted fuel or water from the stack 100.

The controller 140 measures the system state of the stack 100. The system state can comprise, for example, the output voltage (V), the output current (I), and/or the temperature (T), of the stack 100. The controller 140 controls the operation of the fuel pump 122, and can vary the amount of the fuel pumped from the fuel tank 120 to the recycler 110.

The DMFC system 101 comprises an injection pump 112, to move the mixed fuel from the recycler 110 to the anode of the stack 100; a first trap 114 to discharge undesired gas, such as carbon dioxide, from fluids discharged from the anode of the stack 100 and can facilitate the transfer of the unreacted fuel to the recycler 110; a condenser 116 to condense fluids discharged from the cathode of the stack 110; a second trap 117 to discharge the undesired gas; a first flux regulator 118 to regulate the amount of water discharged from the cathode of the stack 100; and a second flux regulator 118a to regulate the amount of water introduced into the recycler 110 from the water tank 119. The controller 140 controls the throughput and/or operating time of the flux regulators 118 and 118a, thereby controlling the amount of water supplied from the water tank 119 to the recycler 110 and/or the amount of water introduced from the stack 100 to the recycler 110, according to variations in the system state of the stack 100. Below, an operation control process of the DMFC system 101 will be described in detail with reference to FIGS. 2, 3, 4A, and 4B.

Figure 2:
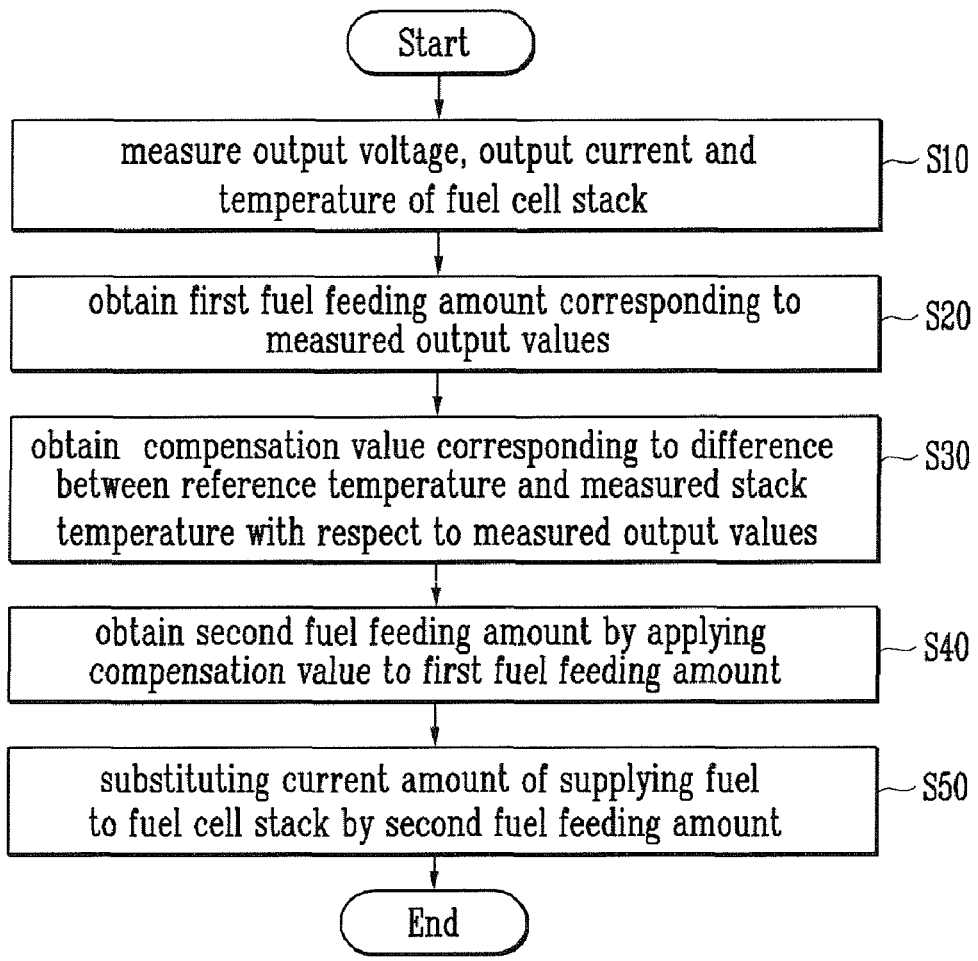
FIG. 2 is a flowchart of a fuel cell system operation control method, according to an exemplary embodiment of the present invention.

FIG. 2 is a flowchart of a fuel cell system control method, according to an exemplary embodiment of the present invention. At operation S10, the controller 104 measures the system state (output voltage, output current, and temperature) of the stack 100. The controller 104 can take multiple system state measurements at predetermined time intervals.

At operation S20, a first fuel feeding amount is determined, using the output voltage and current. This operation is to calculate, or derive, a first fuel feeding amount, corresponding to an output value measured at a previous operation, by using a reference fuel feeding amount function. The reference fuel feeding amount function uses the output current or the output power, to determine a first fuel feeding amount.

At operation S30, a compensation value is obtained, corresponding to the difference between the measured temperature and a reference temperature. The reference temperature can be calculated using the measured output power. This operation is to obtain a compensation value to be applied to the first fuel feeding amount.

At operation S40, a second fuel feeding amount is obtained by applying the compensation value to the first fuel feeding amount. This operation is to calculate, or derive, the second fuel feeding amount that relates to the first fuel feeding amount adjusted according to the compensation value.

At operation S50, the amount of fuel supplied from a fuel tank to a recycler and/or the amount of water supplied to the recycler is adjusted, according to the second fuel feeding amount. This operation is to adjust the first fuel feeding amount, according to the results obtained in operations S20, S30, and S40 to a current fuel feeding amount supplied to the recycler. In other words, the concentration of the fuel relative to the water can be adjusted by adjusting the flow of the fuel and/or the water to the recycler. Therefore, the amount of fuel and/or the concentration of the fuel in the mixed fuel, is changed. The flow rate of the mixed fuel to the stack 100 can be held constant when the concentration of the mixed fuel is changed.

The foregoing method of controlling the operation of the fuel cell system can be schematized as follows.

Figure 3:
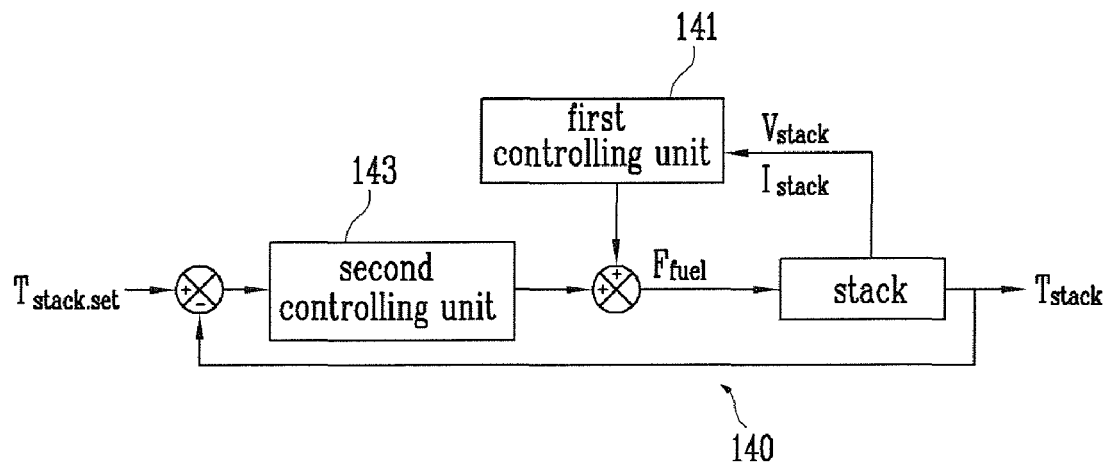
FIG. 3 is a schematic view of the fuel cell system operation control method of FIG. 2.

Referring to FIG. 3, the controller 140 comprises a first controlling unit 141 to calculate or derive the first fuel feeding amount, according to the output variance of the stack; and a second controlling unit 143 to calculate the second fuel feeding amount by adjusting the first fuel feeding amount by the compensation value, thereby adjusting the amount of fuel currently supplied to the stack to approximate the second fuel feeding amount. The first and second controlling units 141, 143, of the controller 140, may be microprocessors or logic circuits, using flip-flops that sequentially operate using information and/or programs stored in a memory.

FIG. 4 linearly represents a fuel flow rate with respect to the output power (W) of the fuel cell stack. The fuel flow rate, corresponding to the output power of the fuel cell stack, can be linearly represented. Here, the output power is defined by the product of voltage and current (watts). The fuel flow rate can also be determined using only the output current of the fuel cell stack. The fuel flow rate corresponds to the fuel feeding amount, if the fuel supplied to the fuel cell stack has a constant concentration. Using this relationship between the output power and the fuel flow rate, the first fuel feeding amount can be obtained with respect to the output current or the output power, of the fuel cell stack.

Figure 4A:
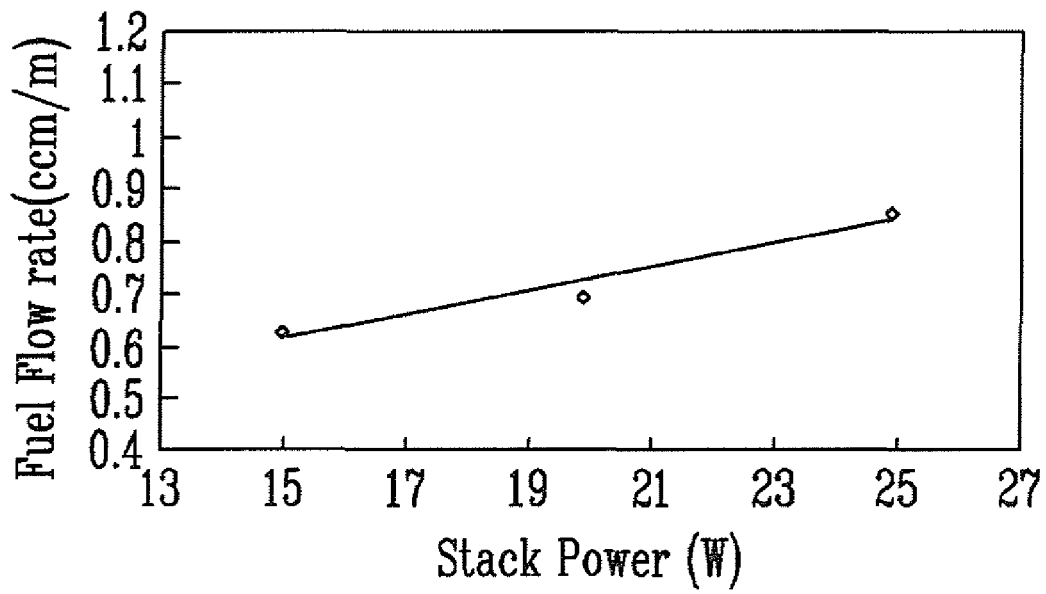
FIGS. 4A and 4B are graphs showing features of a fuel cell stack, suitable to be applied to a fuel cell system operation control method, according to an exemplary embodiment of the present invention.
Figure 4B:
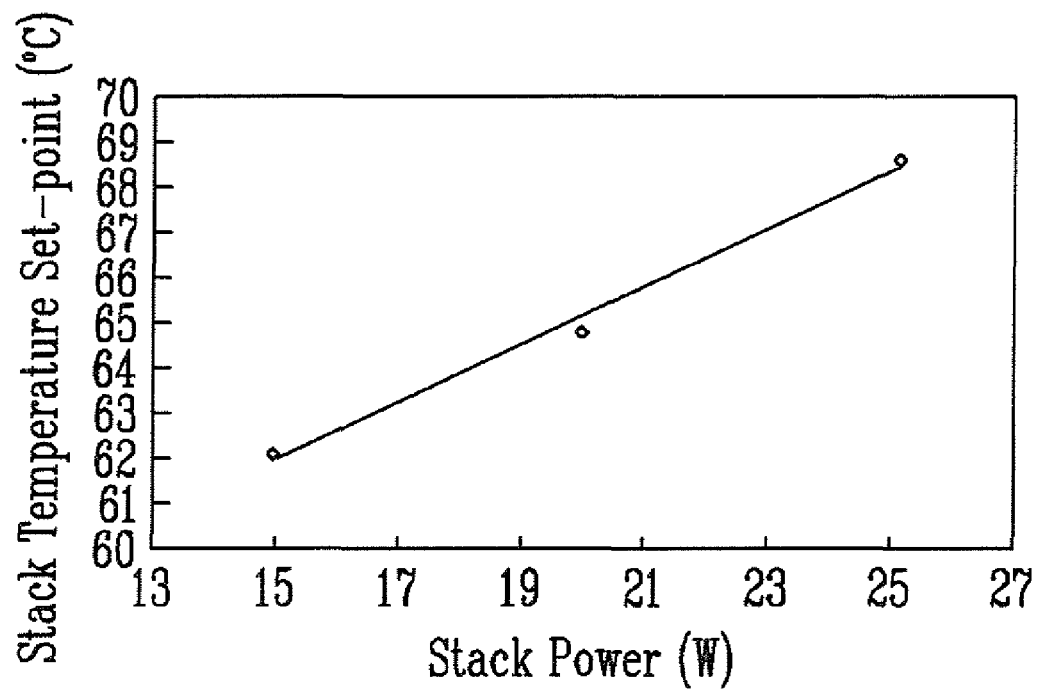

FIG. 4B linearly represents a reference temperature function to determine a reference temperature according to the output power of the stack 100.

As shown in FIG. 4B, the reference temperature function can be linearly represented. Here, a difference between a current temperature, corresponding to the output power of the stack 100, and a reference temperature can be used as a compensation value used to adjust the fuel feeding amount. Using the compensation value, the previously obtained first fuel feeding amount is adjusted so that the second fuel feeding amount can be obtained.

In the foregoing exemplary embodiment, for convenience, the reference temperature function is linear, like a first order function, with respect to the output power of the stack 100, but is not limited thereto. Alternatively, the present teachings may be applied where the reference temperature function is a second order function, a third order function, an index function, a log function, or the like.

The foregoing relationship between the output current and voltage, or the output power, of the stack, and each of the fuel flow rate and the temperature, can be easily found in a general stack. According to an exemplary embodiment of the present invention, the relationship between the fuel feeding amount, and the temperature and output value, of the stack, is used to precisely control the operation of the fuel cell system, without a concentration sensor. Thus, if power required by a load is sharply varied, the fuel feeding amount can be easily controlled, to dynamically adjust the fuel cell stack output, depending on the power required by the load.

Figure 5A:
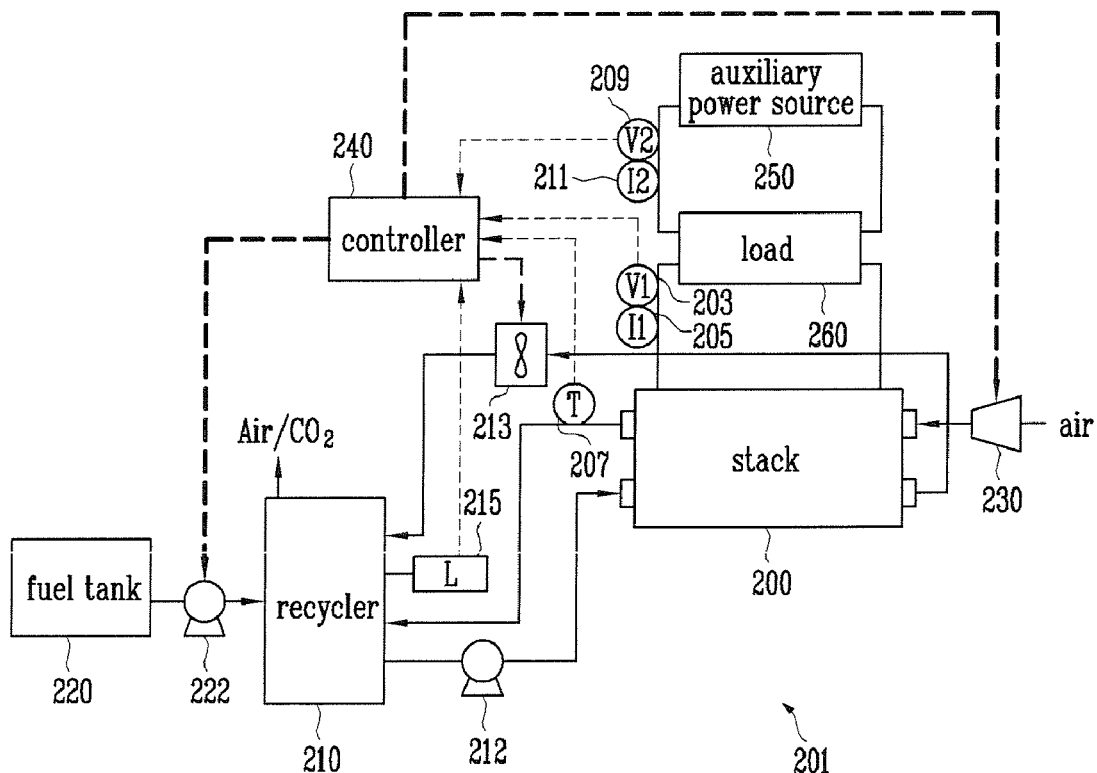
FIG. 5A is a block diagram of a direct methanol fuel cell system using a fuel cell system operation control method, according to an exemplary embodiment of the present invention.
Figure 5B:
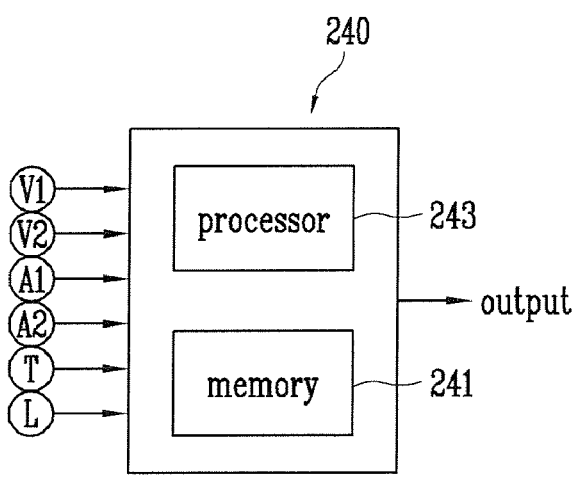
FIG. 5B is a schematic diagram showing an example of a controller in FIG. 5A.

FIG. 5A is a block diagram of a direct methanol fuel cell system (DMFC) 201 that uses a fuel cell system operation control method, according to an exemplary embodiment of the present invention. FIG. 5B is a schematic diagram showing an example of a controller in FIG. 5A.

Below, repetitive descriptions of a structure equal to, or similar to, the previously described DMFC 101 will be avoided as necessary.

Referring to FIG. 5A, the DMFC system 201 comprises a fuel cell stack 200, a recycler 210, a fuel tank 220, an oxidant feeder 230, a controller 240, and an auxiliary power source 250 to supply power to a load 260. The DMFC system comprises: an injection pump 212 to supply a mixed fuel, stored in the recycler 210, to an anode of the stack 200; a fuel pump 222 to supply a fuel, stored in the fuel tank 220, to the recycler 210; and an auxiliary power source 250, such as, a secondary battery. The DMFC system 201 comprises a level sensor 215, to sense a level of the mixed fuel stored in the recycler 210; and a fan 213 to adjust a condensed amount of water discharged from a cathode of the stack 200. Further, the controller 240 can detect a voltage V1, a current I1 and a temperature T, of the stack 200, and can detect a voltage V2 and a current I2 of the auxiliary power source 250. The DMFC system 201 can comprise sensors 203, 205, and 207 to sense the voltage V1, the current I1 and the temperature T, of the stack 200. The DMFC system 201 can comprise sensors 209, 211 to sense the voltage V2, and the current I2 of the auxiliary power source 250.

The controller 240 uses: the voltage V1, the current I1, and the temperature T, of the stack 200; the voltage V2 and the current I2 of the auxiliary power source 250; and the level of the mixed fuel stored in the recycler 210; to regulate the amount of fuel supplied from the fuel tank 220 to the recycler 210, the amount of condensed water discharged from the cathode of the stack 200, and/or the amount of oxidant (e.g., air) supplied to the cathode of the stack 200.

As shown in FIG. 5B, the controller 240 comprises a memory 241 that stores information about fuel cell stack 200, e.g., information about the fuel feeding amount, the temperature, or the like depending on the output current or the output power, of the stack 200. The controller 240 comprises a processor 243 connected to the memory 241, to operate the DMFC system 201, using the information stored in the memory.

A method of controlling the operation of the fuel cell system, according to this embodiment, is similar to the control method shown in FIG. 2. However, the control method of this embodiment further comprises a supplementary control technique.

As an example of the control technique supplement to the foregoing control method for the fuel cell system, the controller 240 controls the oxidant feeder 230, to regulate the amount of oxidant supplied to the cathode of the stack 200, while regulating the fuel feeding amount, depending on the previously obtained first and second fuel feeding amounts. The controller 240 controls the fuel feeding amount, to vary the amount of fuel consumed in the stack 200.

If fuel cell system 201 responds to the power requirement of the load more slowly than the auxiliary power source 250, the controller 240 measures the output voltage and the output current, of the auxiliary power source, and controls the output of the fuel cell system accordingly. The fuel cell system 210 dynamically responds to the substantial power requirement of the load. In other words, if the power requirement of the load is sharply varied, the amount of the fuel supplied to the stack can be adjusted to allow the fuel cell stack and the auxiliary power source, to dynamically adjust the output power, in response to the power requirement of the load.

Figure 6:
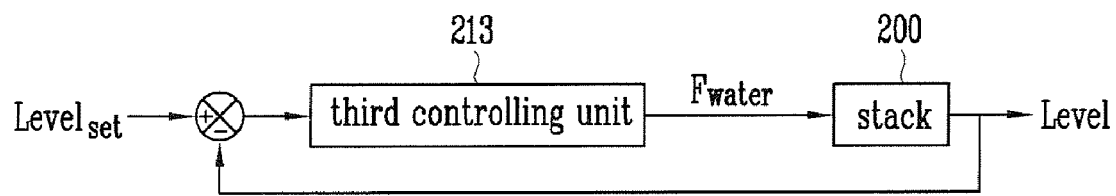
FIG. 6 is a schematic view of a control method to be additionally applied to a fuel cell system operation control method, according to an exemplary embodiment of the present invention.

FIG. 6 is a view schematizing a control method to be additionally applied to a fuel cell system operation control method, according to an exemplary embodiment of the present invention.

A control method supplement to the foregoing method for controlling the operation of the fuel cell system can comprise increasing the level of the fuel stored in the recycler 210 above a predetermined level, before adjusting the amount of the fuel supplied from the fuel tank 220 to the recycler 210, or before adjusting the amount of condensed water introduced from the cathode of the stack 200, into the recycler 210.

Referring to FIG. 6, a third controlling unit 213, of the controller 240, regulates the amount of water, from the cathode of the stack 200, introduced into the recycler 210, in correspondence to the previously obtained second fuel feeding amount. The third controlling unit 213 performs the operations of the first and second controlling units 141, 143, to raise the level of the fuel stored in the recycler 210.

Figure 7:
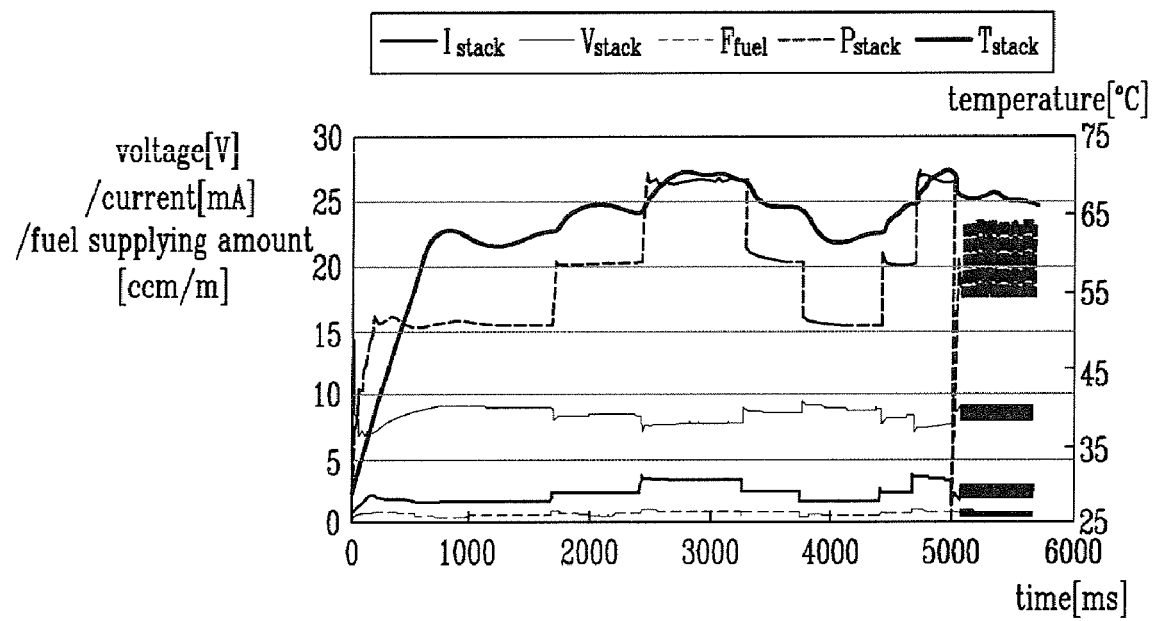
FIG. 7 is a graph showing a dynamic control performance of a fuel cell system, according to a fuel cell system operation control method, according to an exemplary embodiment of the present invention.

FIG. 7 is a graph showing dynamic control operations of a fuel cell system according to a fuel cell system control method.

The output power of the stack increases and decreases, as the amount of fuel supplied to the stack increases and decreases. Thus, using the fuel cell system control method, according to an aspect of the present invention, the supplied amount of fuel is adjusted to more dynamically regulate the output power of the stack, according to the power requirements of the load, than is conventionally taught.

The control method can be applied to the existing structure of a DMFC system 201 and optimally operates a fuel cell system, by regulating the supplied amount of fuel, according to the varying states of the DMFC system.

As described above, in the method and/or the apparatus of controlling the operation of the fuel cell system and a DMFC system using the same, the output of the fuel cell is adjusted dynamically in real time, to the power requirement of the load, even if the power requirement of the load is greatly varied. Further, aspects of the present invention do not need an additional element, such as, a concentration sensor or the like, so that it can be conveniently applied to the existing DMFC system.

Although a few embodiments of the present invention have been shown and described, it would be appreciated by those skilled in the art that changes might be made in this embodiment without departing from the principles and spirit of the invention, the scope of which is defined in the claims and their equivalents.

What is claimed is:

1. A control method for a fuel cell system comprising a stack, a recycler to store a mixed fuel and to supply the mixed fuel to the stack, a fluid supply to supply a fluid to the recycler, and a fuel supply to supply a fuel to the recycler, the method comprising:
    measuring an output voltage, an output current, and a current temperature of the stack;
    inputting the output current and the output voltage into a reference fuel function to determine a first fuel feeding amount relating to an amount of fuel being supplied to the stack;
    inputting the output voltage and the output current into a reference temperature function to calculate a reference temperature;
    calculating a difference between the current temperature and the reference temperature to determine a compensation value; and
    applying the compensation value to the first fuel feeding amount to determine a second fuel feeding amount.

2. The method according to claim 1, further comprising:
    adjusting a current amount of fuel supplied to the recycler, to be in accordance with the second fuel feeding amount.

3. The method according to claim 2, wherein the adjusting of the current amount of fuel supplied to the recycler comprises increasing the current amount of fuel supplied to the recycler.

4. The method according to claim 3, wherein the fuel is a hydrocarbon containing fuel.

5. The method according to claim 2, wherein the adjusting of the current amount of fuel supplied to the recycler comprises decreasing the current amount of fuel supplied to the recycler.

6. The method according to claim 5, wherein the fluid comprises water.

7. The method according to claim 5, wherein:
the recycler is to receive unreacted fuel and water from the stack; and
the adjusting of the current amount of fuel supplied to the recycler further comprises increasing an amount of the water received from the stack.

8. The method according to claim 2, further comprising:
sensing an amount of the mixed fuel stored in the recycler; and
supplying an increased amount of the fuel supplied to the recycler if the sensed amount of mixed fuel is less than a reference fuel level.

9. The method according to claim 2 further comprising:
sensing an amount of the mixed fuel stored in the recycler; and
increasing the amount of water introduced from the stack into the recycler, if the sensed fuel level is lower than a reference fuel level.

10. The method according to claim 3, wherein the adjusting of the current amount of fuel supplied to the recycler further comprises decreasing a current amount of the fluid supplied to the recycler.

11. The method according to claim 3, wherein the adjusting of the current amount of fuel supplied to the recycler further comprises increasing a current amount of the fluid supplied to the recycler.

* * * * *